United States Patent [19]

Boone

[11] 4,294,566
[45] Oct. 13, 1981

[54] EIGHT EDGE POSITIVE CHIP CONTROL INSERT

[75] Inventor: Gary A. Boone, Farmington, Mich.

[73] Assignee: Carmet Company, Pittsburgh, Pa.

[21] Appl. No.: 159,580

[22] Filed: Jun. 16, 1980

[51] Int. Cl.³ .......................... B26D 1/00; B26D 1/12
[52] U.S. Cl. ..................................... 407/114; 407/104
[58] Field of Search ................................ 407/114, 104

[56] References Cited

U.S. PATENT DOCUMENTS

| | | | |
|---|---|---|---|
| 3,142,110 | 7/1964 | Hertel | 407/114 |
| 3,226,797 | 1/1966 | Hertel | 407/114 |
| 3,490,117 | 1/1970 | Hertel | 407/114 |
| 4,074,949 | 2/1978 | Hochmuth et al. | 407/114 |

Primary Examiner—Harrison L. Hinson
Attorney, Agent, or Firm—John K. Williamson

[57] ABSTRACT

A cutter insert presenting eight positive cutting edges has a generally rectangular prismatic configuration to permit its securement in a tool holder having a conventional square insert-receiving pocket. The insert has a pair of opposed primary faces, and four rectangular side faces each having a pair of coplanar, flat lands in opposite corners thereof to permit positive location and clamping of the insert. Each side face also has a laterally opposed pair of positive beveled facets formed therein and intersecting the respective primary faces to define neutral cutting edges for the insert. An elongate groove extends intermediate the beveled facets of each side face parallel to the neutral cutting edges and functions as a chip breaker to provide freer cutting and better chip control. In preferred forms, a square pocketed tool holder is complementally configured to advantageously support the cutter insert in a manner to present a negative angle of attack at the work surface.

10 Claims, 4 Drawing Figures

EIGHT EDGE POSITIVE CHIP CONTROL INSERT

TECHNICAL FIELD

This invention relates to cutting tools for turning in general, and is particularly concerned with a combination tool holder and indexable cutter insert of the type adapted to successively present eight positive shear angle cutting edges.

BACKGROUND ART

It has long been known to provide a single point cutting tool by the combination of a tool holder of common grade tool steel and a cutter insert of more expensive cutting material such as ceramic or tungsten carbide. Typically, such inserts are disposable items and are discarded for scrap once the cutting edges have become dull.

In order to increase the utility of such inserts, it has been the practice to form a number of cutting edges thereupon which may be successively indexed into a desired cutting position so that the effective life of the insert is significantly increased. One problem in the cutter insert industry is that of providing an acceptable number of cutting edges on a insert when a positive shear angle is desired. Conventional practice in this regard has permitted the presentation of only a four-edge positive cutting insert.

One effort to increase the number of positive cutting edges available in a disposable cutter insert is disclosed in U.S. Pat. No. 3,142,110, issued to Hertel, and entitled "Cutting Tool for Lathes and Similar Machines." There, an insert comprised of a pair of truncated pyramidal-like elements, joined at their heads, presents eight positive cutting edges along the bases of the elements. The desired relief angles are achieved by twisting the pyramidal elements relative to one another about their common central axis. While this design does offer an increased number of cutting edges, it presents a serious drawback in that the tool holder pocket for supporting the cutter insert must be specifically configured to complementally receive the complicated geometry of the insert. Moreover, the geometry of the cutter insert is such that it is unsuited for use as both a roughing and finishing tool in applications where chip control is required.

Another approach to this problem is shown in U.S. Pat. No. 3,490,117, also issued to Hertel. There, an eight-edge positive insert of the type disclosed in the U.S. Pat. No. 3,142,110 has an arcuate transition between the opposed cutting edges on each side of the insert. Semi-cylindrical blocks are required for mounting the insert within the square pocket of a tool holder.

SUMMARY OF INVENTION

The present invention overcomes the problems alluded to above by presenting an eight cornered positive insert which maintains a generally rectangular prismatic configuration such that it can be positively located and securely clamped in a tool holder having a conventional square pocket.

A neutral cutting edge is formed along only a portion of the length of each lateral edge of the side faces. The neutral edges of each side face begin at the opposite ends thereof, there being a pair of coplanar flat lands disposed in opposite corners of each side face to establish an outermost flat base for permitting location and clamping against a planar surface.

Each side face of the insert has an elongate groove machined therein to define a chip breaker for controlling chips formed during cutting. This chip breaker, in combination with the neutral angle of the cutting edges, permits the insert to be used as both a rough cut tool and a finishing tool.

DETAILED DESCRIPTION OF THE DRAWINGS

Figure 1:
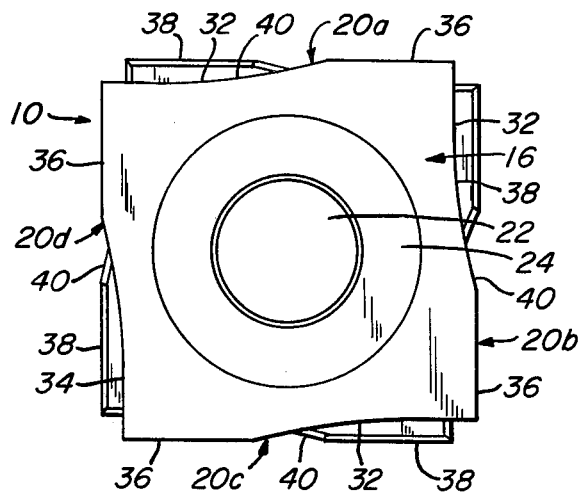
FIG. 1 is an enlarged, front elevation view of a cutter insert constructed in accordance with the principles of the present invention.
Figure 4:
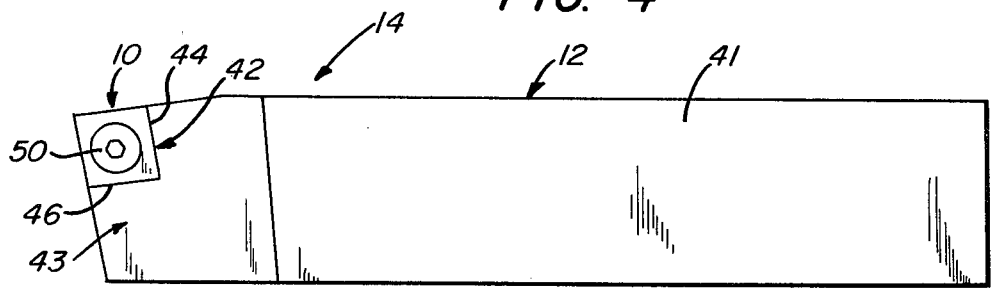
FIG. 4 is a side elevation view of the holder tool shown in FIG. 3 in combination with the insert illustrated in FIG. 1.

In FIG. 1, there is shown a cutter insert 10 of the type adapted to be received within a complemental pocket formed in the end of a tool holder. In this regard, the cutter insert 10 is shown in FIG. 4 attached to a tool holder 12 to form in combination a cutting tool 14.

The insert 10 may be composed of any metal cutting material, though in preferred form tungsten carbide is used. Considering FIG. 1 more particularly, the insert 10 has a generally rectangular prismatic configuration presenting a pair of parallel, laterally offset, aligned primary faces 16, 18 and four substantially identical rectangular side faces 20a, b, c and d, each of which is outwardly bounded by a reference plane extending perpendicularly of the faces 16, 18 and the reference planes of the two immediately adjacent side faces 20. A central bore 22 extends through the insert 10 perpendicularly of the faces 16, 18 and has a tapered countersink 24 at each end for facilitating attachment of the cutter 10 to the tool holder 12 as will be described.

Each side face 20 has an elongate groove 26 formed therein, the longitudinal axis of each groove 26 being substantially equidistant from the faces 16, 18 and extending generally parallel thereto. The grooves 26 function as chip breakers in a manner to be described.

A pair of recessed beveled facets 28, 30 are provided for each side face 20 on opposite sides of the groove 26 to define the cutting faces of the insert 10. The facets 28, 30 intersect the primary faces 16, 18 respectively, to form cutting edges 32, 34, and are inwardly inclined from the cutting edges to the groove 26.

As shown in FIG. 1, the facets 28, 30 of each side face 20 are disposed at opposite ends of the face 20 and extend partially along the length of the lateral edges thereof. Thus, for example, the facet 28a of side face 20a extends from the end thereof adjacent the side face 20b along the partial length of one lateral edge of the face 20a, whereas the facet 30a extends from the end of side face 20a adjacent side face 20d along the partial length of the opposite lateral edge of the face 20a. Manifestly, the corresponding cutting edges 32, 34 extend only part way along the length of the side faces 20.

Figure 2:
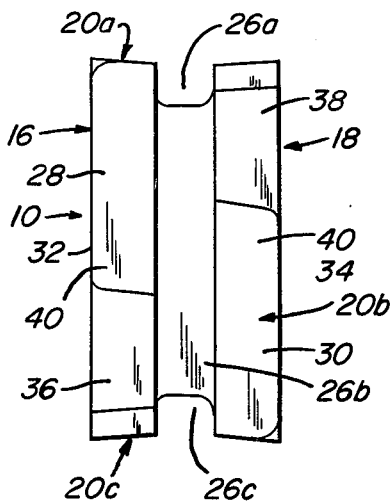
FIG. 2 is an enlarged, side elevation view of the insert.

Each face 20 has a pair of diametrically opposed flat lands 36, 38 disposed at respective inner terminal ends of the facets 28, 30. The lands 36, 38 of each face 20 are substantially coplanar with the reference plane defining the outer boundary for the respective face, and in combination the lands 36, 38 form a planar locating surface for their side face 20. As shown in FIGS. 1 and 2, an arcuate transition surface 40 is disposed intermediate each of the facets 28, 30 and the corresponding lands 36, 38.

As previously explained, the facets 28, 30 slope inwardly from cutting edges 32, 34, and accordingly, they form a cutting angle or shear angle measured from the reference plane associated with their respective side faces 20. Thus, the angle between the primary face 16 and the facet 28 at cutting edge 32 is less than 90° and likewise, the angle between the primary face 18 and the facet 30 is also less than 90°. Accordingly, the edges 32, 34 of the cutter insert 10 are, by definition, positive. In preferred forms, the shear angle formed by the facets 28, 30 (i.e., the cutting faces) with the side face reference plane is in the range of 10° to 30°. In the embodiment shown, this angle is 10°.

Considering again FIG. 1, there is shown that the cutting edges 32, 34 in each side face 20 are parallel to the corrsponding flat lands 36, 38 and the side face reference plane. Thus, the cutting edge angle is neutral in the insert 10. However, as will be explained hereinbelow, the tool holder 12 is designed to position the insert 10 such that the cutting edges 32, 34 form a desired negative angle of attack (back rack angle) at the workpiece. The neutral angle of the cutting edges 32, 34 in insert 10 is believed to contribute to improved cutting performance exhibited by the invention and permits the inclusion of the chip breaker groove 26 without inhibiting the ability of the insert 10 to function as a roughing tool.

Figure 3:
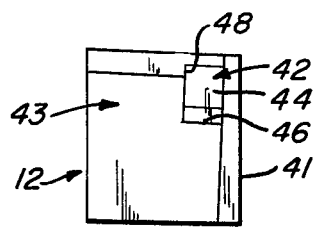
FIG. 3 is an end view of a complemental tool holder for the insert illustrated in FIG. 1.

Considering now FIGS. 3 and 4, the tool holder 12 has a generally elongate shank 41, of rectangular transverse cross-section and an insert-supporting structure 43 at one end of the shank 41. The holder 12 is adapted to be supported on a lathe with the sides of the shank 41 upright and the top and base thereof substantially horizontal.

The supporting structure 43 has a square pocket 42 formed therein adapted to support the cutter insert 10 in offset relationship to the shank 41. The pocket 42 comprises a pair of side surfaces 44, 46 disposed substantially perpendicularly of one another and a base surface 48 extending perpendicularly of the surfaces 44, 46. A threaded hole (not shown) formed in the holder 12 centrally of the base surface 48 is provided for receiving a bevel head mounting screw 50 which projects through the central bore 22 when the insert 10 is clamped to the holder 12. In preferred forms, the axis of theaded hole is slightly offset toward the surfaces 44, 46 with respect to the axis of the central bore 22 when the insert is disposed within the pocket 48, whereby the side faces 20 are clamped against the side surfaces 44, 46 by action of the screw 50 against the counterbore 24. In this regard, it is noted, for example, that when the insert 10 is disposed with side face 20b in contact with the side surface 46 and side face 20c in contact with the side surface 44, the flat lands 36, 38 on the respective side faces form a secure base for locating the insert 10 relative to the tool holder 12, and for withstanding the clamping forces at the interface without damaging either the holder 12 or the insert 10.

As shown in FIG. 3, the supporting structure 43 has a side relief 52 machined therein which forms a side relief angle relative to the normally upright sides of the shank 41. Additionally, as illustrated in FIG. 4, a downwardly sloping top relief 54 is machined in the structure 43 and forms a top relief angle with the top of the shank 41. As further shown in these figures, base surface 48 is parallel to the side relief 52 and side surface 44 is parallel to the top relief 54 such that the insert is carried in squared relation to the structure 43 when mounted within the square pocket 42. By virtue of this arrangement, and since the cutting edges 32, 34 are neutral as described hereinabove, the angle of attack at the workpiece is equal to the top relief angle. In preferred forms, this angle is negative as shown.

One important feature of the insert 10 is its ability to function as both a roughing and finishing tool while maintaining positive chip control capability. In this regard, it is well known that rough turning is generally accomplished at low workpiece speeds and high tool feed speeds, while finish turning is performed at high workpiece speeds and low tool feed speeds. However, positive chip control (i.e., formation of relatively short, broken chips as opposed to long stringy chips) is difficult in finish turning because of the tendency to form undesirable long, stringy chips at low tool feed speeds. Nevertheless, stringy chips must be avoided because they are detrimental to operator safety and require continuous manual removal to avoid damage to the workpiece.

Tests were conducted to compare the cutting performance of the insert 10 with the eight-edge insert disclosed in the aforementioned U.S. Pat. No. 3,142,110. Initially, a 3½" diameter workpiece of 1018 steel was turned on a lathe at 790 rpm with the cutting tool set up to take a 0.030" depth of cut. The insert 10 produced an acceptable broken chip at feed rates down to about 0.005"/rev. The prior art insert could not produce an acceptable broken chip at feed speeds below about 0.015"/rev.—substantially above the 0.007–0.008"/rev. feed speed required to produce a finished surface in the range of 80 to 100 microinches. Next, both inserts were used to rough cut at 0.187" depth of cut with the workpiece turning at 290 rpm. Both inserts performed satisfactorily at feed rates of 0.040"/rev. during the rough cut operation.

INDUSTRIAL APPLICABILITY

The present invention can be applied advantageously in all types of machining operations where a positive, single point tool is desired. As explained hereinabove, the cutter insert 10 offers significant advantages over similar eight edge positive inserts heretofore available.

Specifically, the cutter 10 may be used in a tool holder 12 having a square pocket 48 of conventional construction and requires no special support or clamping devices. Thus, the useful life of the insert 10 is greater than conventional multi-edge positive inserts because a greater number of edges are presented, yet no expensive special design tool holders are required.

Additionally, the chip breaker groove 26 in the cutter 10 offers significantly improved chip control over known eight cornered positive cutters. In this connection, the cutter insert of the present invention has the capability of functioning as both a roughing tool and a finishing tool while at the same time providing desired chip control.

What I claim is:

1. An eight-edge cutter insert adapted for use with a tool holder having an insert-receiving square pocket formed therein, said insert comprising:

a generally rectangular prismatic element of cutting material, said element having a pair of parallel, laterally offset primary faces, and four rectangular side faces each outwardly bounded by a respective side reference plane extending perpendicularly of said primary faces and the adjacent side reference planes, each of said side faces having an opposed pair of recessed, beveled facets formed therein, said facets each intersecting a respective primary face to form a cutting edge extending parallel to the side reference plane of the side face containing the said facet, each facet being inwardly inclined away from its respective cutting edge to define a shear angle measured from said side reference plane, said side faces each having a diametrically opposed pair of flat lands substantially coplanar with a respective side reference plane whereby to define a planar base on each side face for permitting said cutter to be accurately located, and securely clamped, in said square pocket.

2. The invention of claim 1; and an elongate chip-breaker groove formed in each of said side faces, each said groove being recessed below said beveled facets and having a longitudinal axis extending generally parallel to said cutting edges.

3. The invention of claim 2; the longitudinal axis of each groove being substantially equidistant from said primary faces.

4. The invention of claim 1; said shear angle being in the range from 10° to 30°.

5. The invention of claim 1; and a central bore passing through said element perpendicular to said primary faces for facilitating attachment of the insert to the holder.

6. An improved cutting tool comprising in combination:

a tool holder having a square insert-receiving pocket formed in one end thereof;

a cutter insert adapted to be received within said pocket; and clamp means for releasably securing said insert in said pocket of said holder, said insert comprising:

a generally rectangular prismatic element of cutting material, said element having a pair of parallel, laterally offset primary faces, and four rectangular side faces each outwardly bounded by a respective side reference plane extending perpendicular of said primary faces and the adjacent side reference planes, each of said side faces having an opposed pair of recessed, beveled facets formed therein, each said facet intersecting a respective primary face to form a cutting edge extending parallel to the side reference plane of the side face containing the said facet, each facet being inwardly inclined away from its respective cutting edge to define a shear angle measured from an edge said side reference plane, said side faces each having a diametrically opposed pair of flat lands substantially coplanar with a respective side reference plane whereby to define a planar base on each side face permitting said cutter to be accurately located, and securely clamped, in said square pocket.

7. The invention of claim 6, said tool holder having a normal cutting position, said primary faces being substantially upright when the tool holder is in its cutting position.

8. The invention of claim 7, said holder having a top relief formed on the pocket end thereof, said pocket being aligned with said top relief to support said insert such that, the cutting edge presented to the workpiece is parallel to said top relief.

9. The invention of claim 8, said top relief sloping downwardly as the pocket end of the holder is approached such that a negative angle of attack is presented by said cutting edge at the workpiece.

10. The invention of claim 6, said clamp means comprising a bevel head mounting bolt, a complemental, bolt-receiving mounting hole with countersunk ends extending centrally through the element perpendicularly of the primary faces and a threaded aperture in said holder adapted to matingly engage said bolt.

* * * * *